(12) United States Patent
Matsuda et al.

(10) Patent No.: US 10,900,138 B2
(45) Date of Patent: Jan. 26, 2021

(54) METALLIC FOIL MANUFACTURING METHOD AND CATHODE FOR MANUFACTURING METALLIC FOIL

(71) Applicant: HITACHI METALS, LTD., Tokyo (JP)

(72) Inventors: Junichi Matsuda, Tokyo (JP); Atsushi Okamoto, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/328,509

(22) PCT Filed: Oct. 30, 2017

(86) PCT No.: PCT/JP2017/039050
§ 371 (c)(1),
(2) Date: Feb. 26, 2019

(87) PCT Pub. No.: WO2018/138989
PCT Pub. Date: Aug. 2, 2018

(65) Prior Publication Data
US 2020/0370190 A1    Nov. 26, 2020

(30) Foreign Application Priority Data

Jan. 25, 2017 (JP) .................................. 2017-010982

(51) Int. Cl.
*C25D 1/20* (2006.01)
*C25D 1/04* (2006.01)
(Continued)

(52) U.S. Cl.
CPC .................. *C25D 1/20* (2013.01); *C23C 8/02* (2013.01); *C23C 8/10* (2013.01); *C25D 1/04* (2013.01); *C25D 11/26* (2013.01)

(58) Field of Classification Search
None
See application file for complete search history.

(56) References Cited

U.S. PATENT DOCUMENTS 5,441,627 A     8/1995   Kato et al.
6,153,077 A *  11/2000   Kato ........................ C25D 1/04
                                                                 205/77
(Continued)

FOREIGN PATENT DOCUMENTS

CN         1275176         11/2000
CN        104603334    *    5/2015 ............. C25D 17/00
(Continued)

OTHER PUBLICATIONS

Notification of Reason for Refusal dated Jul. 3, 2019 in Korean Patent Application No. 10-2019-7007994, with English translation.
(Continued)

*Primary Examiner* — Stefanie S Wittenberg
(74) *Attorney, Agent, or Firm* — Wenderoth, Lind & Ponack, L.L.P.

(57) ABSTRACT

Provided are a metallic foil manufacturing method in which a metallic film electrodeposited by electrolysis on the surface of an electrodeposition surface of a cathode is peeled off to form a metallic foil, and the electrodeposition surface used therein is obtained by subjecting a roughened surface, which results from roughening a smoothed surface made of titanium or titanium alloy using a blast treatment, etc., to an oxidation treatment selected from thermal oxidation, anodic oxidation (preferably anodic oxidation carried out while moving the anodic oxidation solution), or a combination treatment of thermal oxidation and anodic oxidation so that the electrodeposition surface has an oxidation layer with a thickness of 30 to 250 nm on the uppermost layer and has a surface roughness RZJIS of 4 to 10 μm.

6 Claims, 4 Drawing Sheets

(51) Int. Cl.
  *C23C 8/02* (2006.01)
  *C23C 8/10* (2006.01)
  *C25D 11/26* (2006.01)

(56) References Cited

U.S. PATENT DOCUMENTS

| | | |
|---|---|---|
| 2003/0116241 A1 | 6/2003 | Tomonaga et al. |
| 2010/0038115 A1 | 2/2010 | Matsuda et al. |
| 2013/0323527 A1 | 12/2013 | Matsunaga et al. |

FOREIGN PATENT DOCUMENTS

| | | | | |
|---|---|---|---|---|
| EP | 0598517 | * | 5/1996 | ............... C25D 1/04 |
| EP | 1 038 994 | | 9/2000 | |
| JP | 03-017290 | | 1/1991 | |
| JP | 07-216586 | | 8/1995 | |
| JP | 7-228996 | | 8/1995 | |
| JP | 8-236120 | | 9/1996 | |
| JP | 09-125290 | | 5/1997 | |
| JP | 2001-342589 | | 12/2001 | |
| JP | 2002-194585 | | 7/2002 | |
| JP | 2005-150265 | | 6/2005 | |
| JP | 2007-154237 A | | 6/2007 | |
| JP | 2007-217787 | | 8/2007 | |
| JP | 2015-124423 | | 7/2015 | |
| KR | 10-2013-0124987 | | 11/2013 | |
| WO | WO2000015875 | * | 3/2000 | ............... C25D 1/04 |

OTHER PUBLICATIONS

International Search Report, issued in corresponding International Patent Application No. PCT/JP2017/039050 dated Dec. 5, 2017, with English language translation.

Office Action dated Jul. 23, 2019 in corresponding Chinese Patent Application No. 201780057856.4, with English translation.

Written Opinion of the International Searching Authority dated Dec. 5, 2017 in International (PCT) Application No. PCT/JP2017/039050, with English translation.

Extended European Search Report dated Nov. 10, 2020, in corresponding European Patent Application No. 17894555.6.

* cited by examiner

METALLIC FOIL MANUFACTURING METHOD AND CATHODE FOR MANUFACTURING METALLIC FOIL

TECHNICAL FIELD

The present invention relates to a metallic foil manufacturing method and a cathode for manufacturing a metallic foil. For example, the invention relates to a metallic foil manufacturing method in which a metallic film of aluminum, copper or the like that is electrodeposited by electrolysis on a surface of an electrodeposition surface of a cathode for manufacturing a metallic foil is peeled off to form a metallic foil, and the cathode for manufacturing a metallic foil which is preferable when being used therein.

BACKGROUND ART

In recent years, electric storage devices typified by lithium-ion secondary batteries, super capacitors (such as electric double layer capacitors, redox capacitors, lithium-ion capacitors, etc.) or the like that can be repeatedly charged and discharged, and have high capacity and high energy density is increasingly used, and research and development on the increase in capacity and energy density have progressed prosperously and the demand growth in the future has been greatly expected. The positive electrode current collector of such an electric storage device is generally configured by an active material layer containing a positive electrode active material such as metallic oxide particles for storing electric energy, and an aluminum foil serving as a main body of the positive electrode current collector supporting the active material layer on a surface thereof. Meanwhile, a negative electrode current collector is configured by a copper foil as a main body thereof.

The aluminum foil is manufactured mainly by a rolling method. This is because the standard electrode potential of aluminum is lower than hydrogen and it is difficult to apply electrolysis that is suitable for thinning, but recently research and development for manufacturing an aluminum foil by electrolysis is proceeding. For example, JP-A-2015-124423 (Patent Literature 1) discloses a method for manufacturing an aluminum foil by electrolysis in which a part of an surface of a cathode drum and an anode member arranged to face the surface are immersed in an electrolytic solution (plating solution), aluminum is electrodeposited on a specific surface (hereinafter, referred to as the "electrodeposition surface") of the cathode drum by applying a current between both electrodes under a predetermined condition, the aluminum is further grown to a specific thickness to form an aluminum film, and the aluminum foil is obtained by peeling off the aluminum film. Further, in the case of the copper foil, a manufacturing method by electrolysis using the above cathode drum hut not being limited to the negative electrode current collector is disclosed in many literatures, such as JP-A-2007-217787 (Patent Literature 2), JP-A-2005-150265 (Patent Literature 3), JP-A-2001-342589 (Patent Literature 4), JP-A-7-228996 (Patent Literature 5), or JP-A-2002-194585 (Patent Literature 6).

Generally, a metal material such as titanium excellent in corrosion resistance is used as the electrodeposition surface of the cathode drum for electrodepositing the above metal. It is confirmed that even the electrodeposition surface is made of a titanium material, fine recesses are generated due to corrosion or oxidation dining continuous use, and peelability of the electrodeposited copper (copper film) is deteriorated, which adversely affects the quality of the copper foil (Patent Literatures 2 to 6). It is reported that in order to prepare surface morphology of the electrodeposition surface which became uneven due to the generation of fine recesses, it is necessary to perform periodic maintenance such as mechanical polishing, for example, buffing polishing, electrolytic polishing or the like, and chemical treatments, for example, anodic oxidation or the like (Patent Literatures 2 to 6). It is reported that the electrodeposition surface affects crystal growth of the metal if a surface roughness is too large, and the metal (metal film) is peeled off during growth if the surface roughness is too small (Patent Literature 4). Further, it is reported that in order to improve the peelability of the electrodeposition surface, it is preferable to, for example, set a surface roughness $R_{ZJIS}$ to 2.0 μm or less when forming an oxidation layer by anodic oxidation (Patent Document 5).

CITATION LIST

Patent Literature

Patent Literature 1: JP-A-2015-124423
Patent Literature 2: JP-A-2007-217787
Patent Literature 3: JP-A-2005-150265
Patent Literature 4: JP-A-2001-342589
Patent Literature 5: JP-A-7-228996
Patent Literature 6: JP-A-2002-194585
Patent Literature 7: JP-A-8-236120

SUMMARY

Problems to be Solved by Invention

In the metallic foil (electrolytic foil) manufactured by the electrolysis using the above cathode drum, a surface (peeling surface) peeled from the electrodeposition surface becomes a surface with metallic luster, a surface (free surface) in contact with the electrolytic solution became a surface having no luster, and there is a clear difference in the surface morphology between the peeling surface and the free surface. This is due to a difference in forming process of both surfaces. Since the surface morphology of the electrodeposition surface polished smoothly such that the metallic film can be easily peeled off is transferred, the peeling surface of the metallic foil has a smooth surface morphology almost equal to that of the electrodeposition surface. Since the electrodeposited metal grows freely at different rates in each crystal face in the free surface of the metallic foil, the surface in contact with the electrolytic solution tends to have uneven surface morphology. In the aluminum foil applied to the main body of the above positive electrode current collector, the active material layer can be stably supported thereon, so that it is preferable that the aluminum foil has a surface morphology as the free surface. Since the peeling surface is smooth, the surface morphology between the front and back sides of the aluminum foil is much different, which may be adversely affect the electric characteristics of the electric storage device. In a case of reducing a difference in the surface morphology of the metallic foil, there is known a method of moderately roughening the peeling surface of the metallic foil which is smoother than the free surface, but a problem thereof has also been pointed out (for example, Patent Literature 7).

Therefore, in order to form the peeling surface of the metallic foil with uneven surface morphology equivalent to that of the free surface without using a method of performing a roughening treatment on the metallic foil, a roughly polished electrodeposition surface, an electrodeposition surface with metallic particles scattered by a plating treatment, an electrodeposition surface with recesses scattered by an etching treatment, or an electrodeposition surface subject to a blast treatment were tried. However, cracks and fractures occurred during growth of the metal into a metal film of predetermined thickness by electrodeposition. In addition, there is a problem that the metal film formed to a predetermined thickness cannot be peeled off soundly from the roughened electrodeposition surface. Traces such as polishing traces or the like which are not observed on the tree surface were confirmed on a peeling surface of a metallic foil piece which was not peeled off soundly.

An object of the invention is to provide a metallic foil manufacturing method and a cathode for manufacturing a metallic foil with which a metal (metallic film) electrodeposited on an electrodeposition surface of a cathode is easily peeled off; and a difference in surface roughness between, a peeling surface and a free surface of the metallic foil obtained upon peeling of the metallic film is reduced.

Means for Solving Problems

The problem of peelability of a metallic film from an electrodeposition surface, subjected to the roughening treatment, of the cathode was discussed, and it was found that the metallic film is peeled off from the electrodeposition surface easily and a difference in surface roughness between a peeling surface and a free surface of the metallic foil obtained upon the peeling thereof is reduced by performing an active oxidation treatment after a roughening treatment on a smoothed surface made of a titanium material as the electrodeposition surface, which was conceived in the invention.

That is, the metallic foil manufacturing method of the invention is a method for manufacturing a metallic foil formed by peeling a metallic film electrodeposited by electrolysis on a surface of an electrodeposition surface of a cathode. The method uses the electrodeposition surface formed by performing a roughening treatment on a smoothed surface made of titanium or titanium alloy to form a roughened surface; and performing any oxidation treatment of thermal oxidation, anodic oxidation, or a combination treatment of thermal oxidation and anodic oxidation on the roughened surface to form an oxidation layer with a thickness of 30 nm to 250 nm and a surface roughness $R_{ZJIS}$ of 4 μm to 10 μm on an outermost layer.

It is preferable that the oxidation treatment is anodic oxidation and the anodic oxidation is performed while moving an anodic oxidation solution in contact with the roughened surface.

It is preferable that the anodic oxidation is performed while moving the anodic oxidation solution in contact with the roughened surface by any one of means for applying a liquid flow, means for applying ultrasonic waves, or combination of the means for applying a liquid flow and the means for applying ultrasonic waves.

As a pre-treatment for the oxidation treatment, any one of an immersing treatment in an alkaline solution, an immersing treatment in a strongly acidic solution, or a combination treatment of the immersing treatment in the alkaline solution and the immersing treatment in the strongly acidic solution can be performed on the roughened surface.

The roughening treatment is preferably a blast treatment.

It is preferable to use the electrodeposition surface in which a center portion thereof in a width direction of the cathode has a surface roughness $R_{ZJIS}$ of 4 μm to 10 μm, and adjacent portions thereof on both sides of the center portion have a surface roughness $R_{ZJIS}$ of 2.5 μm or less.

It is preferable to use the electrodeposition surface in which a ratio of a width of each adjacent portion to a width of the center portion is 0.1% to 10%. The surface roughness $R_{ZJIS}$ in the invention is ten point average roughness and refers to JIS-B0601: 2013 (Table C2, etc.).

The cathode for manufacturing a metallic foil preferred when being used in the metallic foil manufacturing method of the invention described above, is a cathode made of titanium or titanium alloy and used for forming a metallic foil obtained by peeling off a metallic film electrodeposited by electrolysis on a surface of an electrodeposition surface of the cathode. The electrodeposition surface has an oxidation layer with a thickness of 30 nm to 250 nm on the outermost layer and has a surface roughness $R_{ZJIS}$ of 4 μm to 10 μm.

It is preferable that the electrodeposition surface includes, in a width direction of the cathode, a center portion having a surface roughness $R_{ZJIS}$ of 4 μm to 10 μm, and adjacent portions adjacent to both sides of the center portion and having a surface roughness $R_{ZJIS}$ of 2.5 μm or less.

It is preferable that a ratio of the width of each adjacent portion to the width of the center portion is 0.1% to 10%.

Effects of Invention

According to the application of the invention, the metal (metallic film) electrodeposited on the electrodeposition surface of the cathode is easily peeled off, and a difference in the surface roughness between the peeling surface and the free surface of the metallic foil obtained upon peeling of the metallic film is reduced. Therefore, the invention is a technique useful for manufacturing a metallic foil such as, an aluminum foil which is suitable for the main body of the positive electrode current collector, for example.

DESCRIPTION OF EMBODIMENTS

The metallic foil manufacturing method of the invention belongs to the technical field of electrolysis disclosed in Patent Literatures 1 to 6 and known techniques can be applied to basic manufacturing devices and electrolytic conditions of electrodeposition of a metal to be manufactured, peeling of a metallic film, compositions of the electrolytic solution, or the like. Generally, in order to secure the mechanical strength of a thin metallic frill (for example, a metallic foil having a thickness of 20 μm or less), it is desirable that no holes or the like are present inside the metallic foil. However, for example, in a case where the metallic foil is an aluminum foil, the aluminum foil may be obtained with such morphology that unintended fine holes (which become recesses on a surface) are dispersed due to a weather content (for example 100 ppm or more) of a nonaqueous aluminum electrolytic solution. The metallic foil such as an aluminum foil having a large number of holes therein is undesirable because the mechanical strength tends to be lowered and there is a fear of damage due to the mechanical strength. Therefore, a manufacturing method in which fine holes are difficult to be formed inside a metallic foil is desired.

A configuration example of a metallic foil manufacturing device applicable to the invention will be described.

Figure 1:
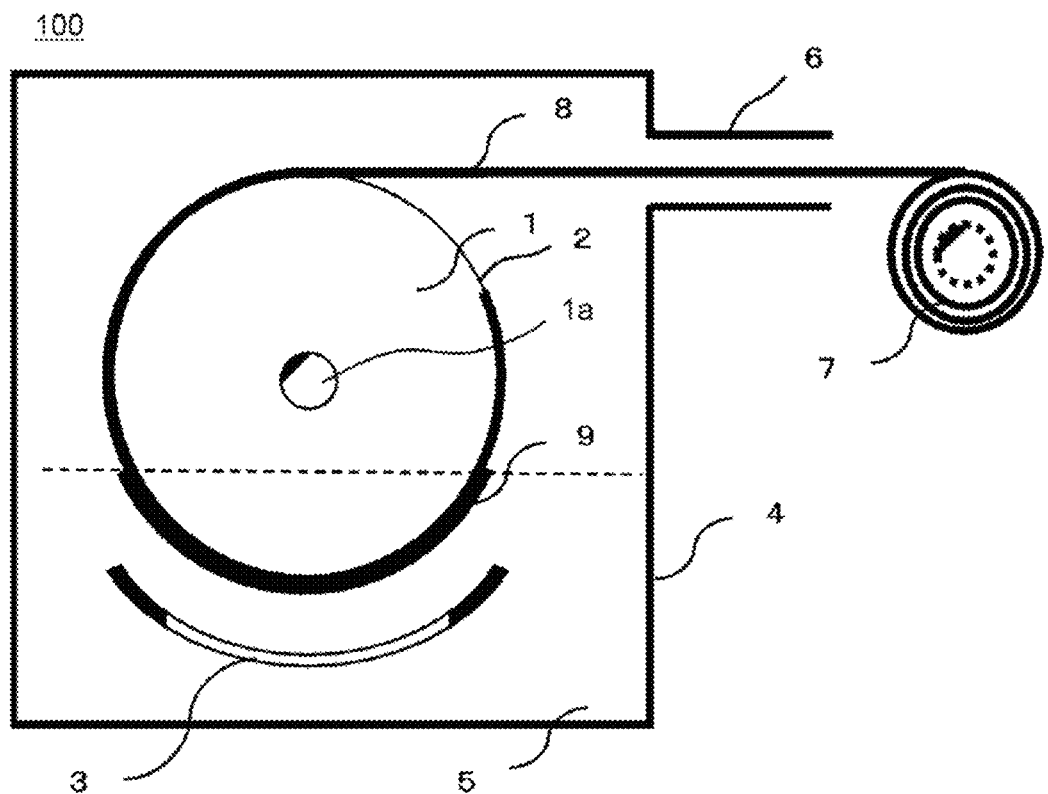
FIG. 1 is a diagram showing a configuration example of a metallic foil manufacturing device applicable to the invention.

FIG. 1 shows a configuration example using a cathode of drum type (cathode drum), and is a schematic view showing a cross section of a device 100 in a direction perpendicular to a rotation shaft 1a of a cathode drum 1. In the configuration example shown in FIG. 1, as a preparation stage before manufacturing a metallic foil, an electrolytic solution 5 whose composition or the like is adjusted so as to be suitable for the metal to be electrodeposited is prepared. The prepared electrolytic solution 5 is stored in an electrolytic bath 4 whose atmosphere or the like is adjusted so as to be suitable for the electrolytic solution 5. A part of an outer periphery 2 of the cathode drum 1 and an anode member 3 arranged to face the outer periphery 2 are immersed in the electrolytic solution 5. One end of a lead member 8 for peeling off and drawing out an initial metal film 9 gown to a predetermined thickness by electrodeposition is adhered and fixed to the outer periphery 2 of the cathode drum 1 which is not immersed in the electrolytic solution 5. The other end of the lead member 8 is guided from a drawing-out opening 6 of the electrolytic bath 4 to an outside and fixed to a winding reel 7. The lead member 8 can also be used as a lead metallic foil by leaving one end of a lead metallic film electrodeposited on the outer periphery 2 of the cathode drum 1 in advance and peeling off the other end side thereof. In a case where the outer periphery 2 of the cathode drum 1 is, for example, a titanium material, it is preferable to form the lead member 8 (lead metallic film and lead metallic foil) by copper electrolysis to be described later, because sufficient adhesion to the outer periphery 2 of the cathode drum 1 can be obtained.

After such a preparation stage, in the manufacturing of the metallic foil, in order to form the metallic film 9 gown from the electrodeposition of the metal to the peeling thereof to have the same thickness as that of the metallic foil to be manufactured, manufacturing conditions such as a temperature of the electrolytic solution 5, magnitude of a current (electrolytic current) applied between the cathode drum 1 and the anode member 3 and a peripheral speed during rotation of the cathode drum 1 are adjusted. Thereafter a predetermined electrolytic current is applied between the electrodeposition surface of the cathode drum 1 and the anode member 3, the cathode drum 1 is rotated in one direction, and the metal is electrodeposited and grows on a surface of the electrodeposition surface of the cathode drum 1. The metal film 9 grown to, a predetermined thickness is drawn out from the electrolytic solution 5 by the rotation of the cathode drum 1, then the lead member 8 is drawn out by rotation of winding reel 7 that is synchronous with the rotation of the cathode drum 1, and the metal film 9 is peeled from the electrodeposition surface of the cathode drum 1 together with the lead member 8. By continuing the synchronous rotation of the cathode drum 1 and the winding reel 7 as it is, following the metal film 9 peeled off together with the lead material 8, a newly electrodeposited and grown metal film is continuously peeled off and collected on the winding reel 7. By such a series of manufacturing processes, a long metallic foil having a predetermined thickness (for example, about 1 μm to about 50 μm) can be continuously manufactured. The metallic foil thus manufactured having a thickness of about 3 μm to about 20 μm is suitable for various applications. For example, the aluminum foil is suitable for a main body of the positive electrode current collector or the like.

Another metallic foil manufacturing device applicable to the invention will be described.

Figure 2:
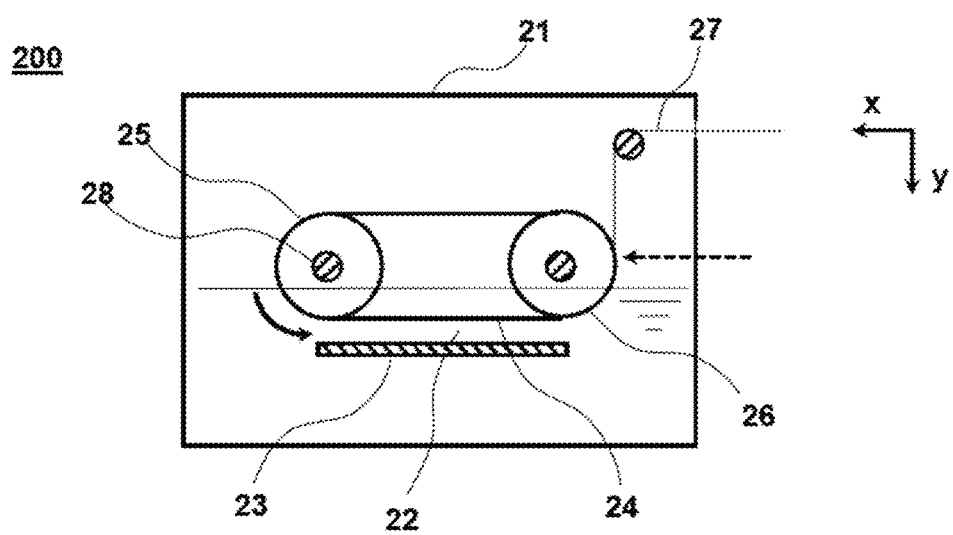
FIG. 2 is a diagram showing a configuration example of a cathode of belt type (cathode belt) applicable to the invention.

FIG. 2 shows a configuration example using a cathode of belt type (cathode belt), and is a schematic view showing a cross section of a device 200 in a direction perpendicular to a rotation shaft 28 of each roller to be described later. In the configuration example shown in FIG. 2, an electrolytic solution 22 for electrodepositing a metal (for example, aluminum) is stored in an electrolytic bath 21 whose atmosphere or the like is adjusted so as to be suitable for the electrolytic solution 22. A part (lower side) of a cathode belt 24 and an anode member 23 arranged to face the cathode belt 24 are immersed in the electrolytic solution 22. The cathode belt 24 is a band-shaped electrode configured in an annular shape. The cathode belt 24 is wound around a plurality of rollers (driving roller 25 and driven roller 26) including a driving roller 25, and is configured to move (run) in the electrolytic solution 22 by rotation of the driving roller 25. The anode member 23 and the cathode belt 24 are connected to an external power supply (not shown) of the electrolytic bath 21. The cathode belt 24 moves (runs) in a state of energizing between the anode member 23 and the cathode belt 24, so that a metal is deposited and gown on a surface (liquid contact surface) of the cathode 24 belt which is immersed in the electrolytic solution 22. The metallic film gown to a predetermined thickness is continuously peeled off from the cathode belt 24 at a position of an arrow indicated by a broken line in the figure, so as to form a metallic foil. A long metallic foil having a predetermined thickness can be continuously formed by continuously winding up the peeled metallic foil. In a case where the cathode belt 24 is, for example, a titanium material, it is preferable to form a lead member (lead metallic film and lead metallic foil) by copper electrolysis similarly with the case of the cathode drum 1, because sufficient adhesion to the cathode belt 24 of the lead member can be obtained.

A portion of the cathode belt 24 facing the anode member 23 is parallel to a horizontal direction (direction x). Specifically, the plurality of rollers (driving roller 25 and driven roller 26) around which the cathode belt 24 is wounded are arranged, in the horizontal direction (direction x). The driving roller 25 and the driven roller 26 are arranged such that the rotating shaft 28 is above a liquid surface of the electrolytic solution 22. In the cathode 24 belt, a flat portion on a lower side of a part (flat portion) between the driving roller 25 and the driven roller 26, and parts of portions (curved surface portions) in contact with the driving roller 25 and the driven roller 26 are immersed in the electrolytic solution 22. Meanwhile, the anode member 23 is configured by a plate member of a metal to be electrodeposited (for example, a plate member of aluminum), and faces the flat portion on the lower side of the cathode belt 24. The film forming efficiency of the metallic film (manufacturing efficiency of the metallic foil) can be improved by increasing a distance between the driving roller 25 and the driven roller 26 to increase a length of the band-shaped electrode immersed in the electrolytic solution 22.

From a viewpoint of preventing bubbles or suspended matter generated in the electrolytic solution 22 from remaining or adhering to the metal film, it is preferable that the portion of the cathode belt 24 facing the anode member 23 is not parallel to the horizontal direction (direction x). Therefore, it is possible to move positions of the driving roller 25 and the driven roller 26 in a vertical direction (direction y) so as to incline the flat portion on the lower side of the cathode belt 24. However, from a viewpoint of preventing retention of bubbles generated in the electrolytic solution 22, it is more preferable that the flat portion of the cathode belt 24 is perpendicular (direction y) to the horizontal direction (direction x).

The metallic foil manufacturing method of the invention will be described with reference to FIG. 1 showing the configuration example using the cathode of drum type (cathode drum 1). The cathode made of titanium or titanium alloy in the invention is not limited to the cathode of drum type (cathode drum) as shown in FIG. 1, and the cathode of belt type (cathode belt 24) as Shown in FIG. 2, or the like can also be used. Similarly, treatments such as a roughening treatment and an oxidation treatment in the invention can also be performed on cathode materials such as band-shaped materials (plate materials) serving as the cathode of belt Vale (cathode belt 24).

An important feature of the metallic foil manufacturing method of the invention is that a cathode (such as a cathode of drum type) made of titanium or titanium alloy having an electrodeposition surface formed by specific treatments is used, and a metal is electrodeposited on a surface of the electrodeposition surface formed on the cathode and having a specific surface property. The specific treatments for forming the electrodeposition surface are intended for a series of process in which treatments (1) to (3) described below are performed in this order after preparing a material made of titanium or titanium alloy excellent in corrosion resistance in consideration of a width dimension of the metallic foil to be manufactured, and machining the material of titanium into a predetermined shape. In a case of using the cathode of drum type, the specific treatments are intended for a series of process in which the treatments (1) to (3) described below are performed in this order after machining the material of titanium into a cylindrical shape, for example, having a diameter of 100 mm to 3000 mm and a body length of 100 mm to 2000 mm. As a result, a surface corresponding to the electrodeposition surface of the cathode (such as the cathode of drum type) is formed to have a specific property that is, suitable uneven surface morphology having a surface roughness $R_{ZJIS}$ of 4 µm to 10 µm is formed, and a suitable oxidation layer having a thickness of 30 nm to 250 nm is formed on an outermost layer thereof.

Figure 3:
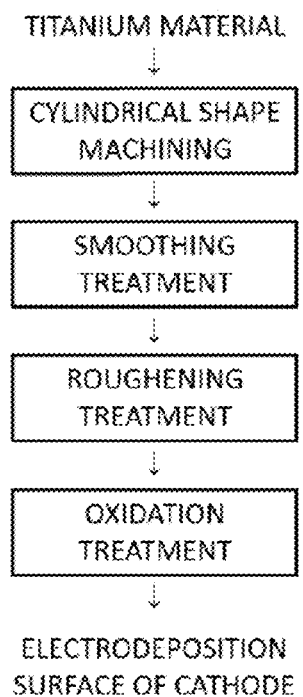
FIG. 3 is a diagram showing a process of forming an electrodeposition surface of a cathode of drum type (cathode drum) applicable to the invention.

FIG. 3 shows a process of forming an electrodeposition surface formed on an outer periphery of a cathode of drum type (cathode drum) applicable to the invention, and next each of the treatments (1) to (3) will be described with reference to this figure.

(1) Smoothing Treatment

In the smoothing treatment according to the invention, a surface of a base material serving as the electrodeposition surface of the cathode is filmed. Specifically, a smoothing treatment is performed on an outer periphery of a titanium material machined into a cylindrical shape corresponding to the cathode drum, so as to form a uniformly smooth outer periphery (smoothed surface). The smoothing treatment may be a mechanical machining method such as cutting, grinding, and polishing, as long as a surface having surface morphology of uniform smoothness, for example, a surface roughness $R_{ZJIS}$ of less than 2 µm (preferably less than 1 µm) can be formed. Even if traces of the smoothing treatment remain on the outer periphery after the smoothing treatment, it can be accepted if the traces can be solved by a subsequent roughening treatment.

(2) Roughening Treatment

In the roughening treatment in the invention the smoothed surface is roughened to form an outer periphery (roughened surface) having a cylindrical shape corresponding to the cathode drum and surface morphology with uniformly rough unevenness. Since a free surface of the metallic foil tends to have uneven surface morphology, if the surface roughness of the electrodeposition surface of the cathode is large, the surface morphology (surface roughness) of the peeling surface and the free surface of the metallic foil obtained upon peeling of the metal (metallic film) electrodeposited on the electrodeposition surface is homogenized, and the difference in the surface morphology (surface roughness) on both surfaces is considered to be reduced. From this viewpoint, the roughening treatment for changing the smoothed surface into the uneven surface morphology is effective, because the smoothed surface corresponding to the electrodeposition surface of the cathode can be changed to a roughened surface having a surface roughness within a predetermined range.

For the roughening treatment, several treatments such as, for example, a blast treatment using a shot material, a chemical polishing treatment using an alkaline or acidic etching solution, or a metal plating treatment for plating metal particles intentionally into surface morphology as dispersed like, for example, sparse islands can be considered. Among them, from a viewpoint that it is desirable to perform treatments in which a large area can be easily machined to have more uniformly rough surface morphology and repetitive reproducibility can be expected, the blast treatment which can be selected variously such as a dry blast treatment, a wet blast treatment, a steel blast treatment or a sand blast treatment, is preferred. In the blast treatment, the surface roughness of the surface to be roughened can be easily adjusted by selection in type and size of the shot material, such as a metal type, a ceramic type, a glass type, or a hard resin type, and by setting of a shot speed, a shot angle, a shot amount, or a shot time. For example, the dry blast treatment or the wet blast treatment in which polygonal alumina particles are sprayed is preferred, because the machining traces remaining on the smoothed surface (surface to be roughened) of titanium material is removed easily to form the uneven surface morphology having a predetermined surface roughness, and the repetitive reproducibility can be expected. By performing such a roughening treatment such as the dry blast treatment or wet blast treatment, an outer periphery (roughened surface) having a surface roughness $R_{ZJIS}$ of 4 µm to 10 µm can, be formed as the outer periphery having a cylindrical shape corresponding to the cathode drum and having surface morphology with uniformly rough unevenness.

(3) Oxidation Treatment

In the oxidation treatment in the invention, the outer periphery (roughened surface) having a cylindrical shape corresponding to the cathode drum and having surface morphology with uniformly rough unevenness is oxidized to form an outer periphery (oxidized surface) having an oxidation layer on an outermost layer thereof. In the oxidation treatment, the roughened surface is actively oxidized to form an oxidation layer with a thickness of 30 nm to 250 nm on the outermost layer instead of a thin oxidation layer (natural oxidation layer) on a surface by natural oxidation. According to the active oxidation treatment, the oxidation layer is uniformly formed on the outermost layer of the uneven surface morphology of the roughened surface without deviation, so that a homogeneous oxide surface having uneven surface morphology can be obtained. As the active oxidation treatment, any oxidation treatment of thermal oxidation, anodic oxidation, or a combination treatment of thermal oxidation and anodic oxidation is performed in the invention. In the combination treatment, the anodic oxidation is performed after the thermal oxidation, or the thermal oxidation is performed after the anodic oxidation. By performing such an active oxidation treatment, an outer periphery (oxidized surface) having a cylindrical shape corresponding to the cathode drum and having surface morphology with uniformly rough unevenness can be formed, and the outer periphery has an oxidation layer with a thickness of 30 nm to 250 nm on the outermost layer and has a surface roughness $R_{ZJIS}$ of 4 μm to 10 μm.

It is considered that the oxidation layer formed by the above oxidation treatment is a layer of an oxide which contains titanium (element) or the like, and the titanium (element) or the like present in the roughened surface of the cathode made of titanium or titanium alloy is oxidized. For example, it is considered that an oxidation layer composed of titanium oxide ($TiO_2$) is generally formed on the roughened surface composed of pure titanium. Further, in the roughened surface composed of titanium alloy such as Ti-6Al-4V alloy and Ti-3Al-2.5V alloy, there is a possibility that an oxidation layer composed of a plural kinds of oxides addition to the main titanium oxide, oxides of elements other than titanium (such as an aluminum oxide, and a vanadium oxide), complex oxides composed of titanium and elements other than titanium, or the like may formed.

The active oxidation treatment for forming an oxidation layer sufficiently thicker than a natural oxidation layer on an outermost surface of the roughened surface can facilitates peeling of the metal film from the electrodeposition surface of the cathode. This is because the oxidation layer separates the metal film and the electrodeposition surface, therefore an attractive force between the metal film and the electrodeposition surface considered to act at an atomic level is reduced, and a load (peeling resistance) generated when the metal film is peeled off is reduced. It has been confirmed that in a case of the natural oxidation layer, damage to the metallic film or the metallic foil due to peeling cannot be suppressed in some cases. This is because a thickness of the natural oxidation layer is thin (thickness of the natural oxidation layer of pure titanium is about 10 nm or less), therefore separation (separation distance) between the metal film and the electrodeposition surface is small, and a reduction degree in peeling resistance of the metal film is considered to be insufficient.

In the above oxidation treatment of the invention, the thermal oxidation may be in-furnace heating (atmospheric heating) or the like in an air atmosphere, and an oxidation layer can be uniformly formed on the outermost surface layer of the entire surface to be oxidized by setting a heating temperature and heating time. For example, in atmospheric heating of pure titanium, an oxidation layer having a thickness of about 30 nm can be formed by holding a temperature at about 500° C. for about 60 minutes to about 120 minutes or holding a temperature at about 600° C. for about 10 minutes. Similarly, an oxidation layer having a thickness of about 50 nm can be formed by holding a temperature at about 600° C. for about 20 minutes, an oxidation layer having a thickness of about 100 nm can be formed by holding a temperature at about 600° C. for about 120 minutes, and an oxidation layer having a thickness of about 130 mu can be formed by holding a temperature at about 700° C. for about 30 minutes to about 120 minutes. When the holding temperature of the heat treatment is high, an emission amount of hydrogen may increase, and a risk that the outermost layer of the roughened surface becomes uneven is increased due to an increase of a difference in crystallization speed. In such a case, the holding temperature is preferably selected in a range of about 500° C. to about 600° C. Further, since a temperature change (heating state change) of a heat treatment space with respect to a change in heating conditions such as the indicated temperature and time is gentle in the thermal oxidation, sensitivity of the temperature change (substantial temperature change) of the surface to be oxidized is relatively low. In such a case, it is, preferable to suppress the temperature difference in the heat treatment space so as not to affect the oxidation uniformity of the surface to be oxidized.

Although an oxidizing ability (ability to form an oxidation layer) by atmospheric heating is sufficiently higher than that of the natural oxidation the anodic oxidation in which the oxidation layer can be grown in a short time is preferred. Therefore, from a viewpoint of the oxidizing ability, the anodic oxidation is preferable as the active oxidation treatment. According to the anodic oxidation, a sufficiently thick oxidation layer can be formed on the surface to be oxidized in a short time (for example, several seconds) by setting an applied current, applied voltage and an energization time. In the anodic oxidation, control on concentration and temperature of an anodic oxidation solution is easy, and sensitivity of the change in the oxidation of the surface to be oxidized with respect to the change in the applied current or applied voltage is high, so that an oxidation degree of the surface to be oxidized can be easily discriminated. Further, according to the combination treatment of thermal oxidation and anodic oxidation, the oxidation layer can be formed thicker than that in a case where each oxidation treatment is performed alone.

In a case of performing the anodic oxidation, the anodic oxidation is preferable such that the pre-treatment is performed as necessary, then an object to be oxidized is immersed in a bath in which an electrolytic solution for the anodic oxidation (for example, an anodic oxidation solution composed of a phosphoric acid aqueous solution having a concentration of 0.5% or more and 20% or less) suitable for members made of titanium or titanium alloy was kept warm (for example, 20° C. or more and 50° C. or less), and energization (voltage application) is performed for only a predetermined time (for example, 0.5 seconds or more and less than 10 seconds) at predetermined cut-off voltage (for example, 5 V or more and less than 200 V). There has been know a method in which anodic oxidation is performed on an object to be oxidized (surface to be oxidized) while an anodic oxidation solution flowing thereon in a state where the object to be oxidized is not immersed at all in the anodic oxidation solution (Patent Literatures 5 and 7). However, in a case where the surface to be oxidized is a roughened surface, the flowing anodic oxidation solution remains in recesses of the roughened surface, and bubbles (gas) generated during the anodic oxidation tend to stay in the recesses of the roughened surface. Further, bubbles (atmospheric gas such as air) are easily entrapped when the anodic oxidation solution flows, and the bubbles tend to stay in the recesses of the roughened surface. If the bubbles stay frequently in the recesses of the roughened surface during the anodic oxidation, defects due to the bubbles may occur on the oxidized surface, and peeling of the metal film from the oxidized surface (electrodeposition surface) may be inhibited. Therefore, it is preferable to immerse the roughened surface, which is the surface to be oxidized, in the anodic, oxidation solution so as to perform the anodic oxidation.

Further, in conventional anodic oxidation applied to members made of titanium or titanium alloy, since the treatment liquid in contact with the surface to be oxidized is decomposed to generate bubbles (gas) during the treatment, the bubbles (gas) generated during the anodic oxidation may stay in the recesses of the surface to be oxidized (roughened surface in which uneven surface morphology is formed by a roughening treatment). If the bubbles (gas) frequently stay in the recesses of the surface to be oxidized, the progress of anodic oxidation on the recess portion is hindered, so that an appropriate oxidation layer is not formed and peeling of the metal film may be adversely affected. In such a case, it is preferable to perform the anodic oxidation while moving the anodic oxidation solution in contact with the roughened surface (surface to be oxidized) after a roughening treatment. Since the anodic oxidation solution in contact with the surface to be oxidized moves, bubbles (gas) generated during the anodic oxidation are easily separated from the recesses on the surface to be oxidized, and the bubbles (gas) can be sufficiently suppressed from remaining in the recesses of the surface to be oxidized. Although not particularly focused on the conventional anodic oxidation method applied to members made of titanium or titanium alloy, the anodic oxidation performed while moving the anodic oxidation solution is extremely effective as means for forming an appropriate oxidation layer on an outermost layer of a roughened surface.

It is preferable that the anodic oxidation which is performed while moving the anodic oxidation solution in contact with the roughened surface (surface to be oxidized) after a roughening treatment uses any means of means for applying a liquid flow, means for applying ultrasonic waves, or combination means of means for applying a liquid flow and means for applying ultrasonic waves.

The means for applying a liquid flow may be, for example, means for configuring a liquid circulation system for pouring an anodic oxidation solution into an anodic oxidation tank and discharging the liquid from the anodic oxidation tank by using a liquid feeding device provided with a pump, or means for stirring the anodic oxidation solution in the anodic oxidation tank by using a stirring device provided with a stirring member such as a stirring blade. Flowing is forcibly generated in the anodic oxidation solution in the anodic oxidation tank by applying such means, so that a liquid flow that flows to such an extent that bubbles (gas) generated during the anodic oxidation can be separated from the recesses of the surface to be oxidized (roughened surface) can be applied to the anodic oxidation solution in contact with the surface to be oxidized. By utilizing movement of the anodic oxidation solution due to the liquid flow, the anodic oxidation solution in contact with the surface to be oxidized can be moved, and the anodic oxidation can be performed while moving the anodic oxidation solution in contact with the surface to be oxidized. The means using the liquid feeding device and the stirring device described above is generally simpler and more inexpensive than the means for applying ultrasonic waves to be described later, and is easy to be applied to a large metallic foil manufacturing device.

The means for applying ultrasonic waves may be, for example, means for applying a predetermined ultrasonic wave to the anodic oxidation solution in the anodic oxidation tank by selecting and using an ultrasonic oscillator capable of applying a frequency and oscillation output (or sound intensity) to such an extent that the bubbles (gas) generated during the anodic oxidation can be separated from the recesses of the surface to be oxidized (roughened surface). It is considered that the anodic oxidation solution in contact with the surface to be oxidized can be moved with higher efficiency according to the means for applying the ultrasonic wave compared to the means for stirring the anodic oxidation solution in the anodic oxidation tank described above. Generally, when an ultrasonic wave having a frequency exceeding 20 kHz is transmitted through the anodic oxidation solution, microscopic high-pressure regions and low-pressure regions are generated in the anodic oxidation solution, and the anodic oxidation solution repeats microscopic contraction and expansion, so that the anodic oxidation solution can be continuously moved at a high speed. A degree of movement of the anodic oxidation solution by application of the ultrasonic wave can be easily adjusted by appropriately selecting the frequency and the oscillation output (sound intensity) of the ultrasonic wave, that is, amplitude of the ultrasonic wave under such control that a liquid quality of the anodic oxidation solution which is a medium does not substantially change.

By utilizing micromotion of the anodic oxidation solution by the means for applying such an ultrasonic wave, the anodic oxidation can be performed while moving the anodic oxidation solution in contact with the surface to be oxidized more efficiently so as to reliably suppress the bubbles (gas) generated dining the anodic oxidation from remaining in the recesses of the surface to be oxidized (roughened surface). The ultrasonic stirring method is preferably applied to a small metallic foil manufacturing device because the anodic oxidation solution is difficult to move greatly. Further, in a case where the ultrasonic stirring method is applied to a large-sized metallic foil manufacturing device or the like, it is preferable to arrange a plurality of ultrasonic transducers at appropriate positions within the anodic oxidation tank considering that a range in which the ultrasonic wave is transmitted effectively is limited.

It is also preferable to adopt the combination means of means for applying a liquid flow and means for applying ultrasonic waves. In this case, the means for applying a flow forcibly can cause a forced flow of the anodic oxidation solution in the anodic oxidation tank, and meanwhile the means for applying ultrasonic waves can move the anodic oxidation solution in contact with the surface to be oxidized with higher efficiency. Therefore, the anodic oxidation on the surface to be oxidized (roughened surface) can be performed while reliably suppressing the bubbles (gas) generated during the anodic oxidation from remaining in the recesses of the surface to be oxidized (roughened surface As a pre-treatment for the oxidation treatment, any of an immersing treatment in an alkaline solution, an immersing treatment in a strongly acidic solution, or a combination treatment of an immersing treatment in an alkaline solution and an immersing treatment in a strongly acidic solution can be performed. The immersing treatment in an alkaline solution can remove stains such as oil on the surface (degreasing effect) by using an alkaline solution such as a sodium hydroxide aqueous solution at about 20° C. to about 80° C. The immersing treatment in a strongly acidic solution can remove a natural oxidation layer formed on the outermost surface (pickling effect). It is preferable that the immersing treatment in a strongly acidic solution is stopped at such an extent that the uneven surface morphology of the roughened surface is not damaged. It is preferable to select the immersing treatment in an alkaline solution or the immersing treatment in a strongly acidic solution as necessary, and each treatment can be performed independently, or both treatments can be combined. Such a pre-treatment can be applied to both the pre-treatment of the thermal oxidation and to the pre-treatment of the anodic oxidation.

In the metallic foil manufacturing method of the invention, an oxidized surface formed by performing the above treatments (1) to (3), that is, performing the smoothing treatment, the roughening treatment, and the oxidation treatment in this order, is used to the electrodeposition surface, and the oxidized surface has an oxidation layer with a thickness of 30 nm to 250 nm on the outermost layer, and has uneven surface morphology with a surface roughness $R_{ZJIS}$ of 4 μm to 10 μm. A cathode made of titanium or titanium alloy and having such an electrodeposition surface is the cathode for manufacturing a metallic foil of the invention, which has an electrodeposition surface having an oxidation layer with a thickness of 30 nm to 250 nm on the outermost layer, and having a surface roughness $R_{ZJIS}$ of 4 μm to 10 μm.

When an oxidation layer with a thickness of 30 nm or more is formed on the outermost layer of the electrodeposition surface, the metal (metallic film) electrodeposited on the electrodeposition surface is easily peeled off, cracks at an edge portion of the metallic film (metallic foil) that occurs easily during peeling and fractures of the metallic film due to the uneven surface morphology are suppressed. From a viewpoint of facilitating the peeling of the metal film from the electrodeposition surface, it is preferable that the thickness of the oxidation layer is large. Further, when an oxidation layer with a thickness of 250 nm or less is formed on the outermost layer of the electrodeposition surface of the cathode, a degree of electrical insulation due to excessive thickening of the oxidation layer is not excessive, so that electrodeposition of the metal onto the electrodeposition surface or growth of the electrodeposited metal is not impaired.

Further, when the electrodeposition surface has a surface roughness $RZ_{JIS}$ of 4 μm to 10 μm, a peeling surface of the metallic foil obtained by peeling off the metallic film formed by growth of the metal electrodeposited on the electrodeposition surface becomes a surface substantially having a surface roughness $R_{ZJIS}$ of 4 μm to 10 μm by transferring the surface morphology of the electrodeposition surface. At this time, the electrodeposition surface having a surface roughness $R_{ZJIS}$ of 4 μm to 10 μm has little influence on the free surface side of the metallic foil, and the peeling surface and the free surface of the metallic foil have substantially the same surface roughness. Therefore, a substantial difference in surface morphology between the peeling surface and the free surface of the metallic foil is suppressed to be small. The difference in surface roughness $R_{ZJIS}$ is suppressed to, for example, 2 μm or less. Therefore, it is possible to manufacture a metallic foil having substantially same surface morphology on front and back surfaces, and it is possible to manufacture an aluminum foil which is a metallic foil suitable for a main body of the positive electrode current collector or the like.

As described above, the cathode includes an electrodeposition surface having an oxidation layer with a thickness of 30 nm to 250 nm on the outermost layer, and having a surface roughness $R_{ZJIS}$ of 4 μm to 10 μm, so that the metal (metallic film) electrodeposited on the electrodeposition surface can be easily peeled off, and the difference in the surface roughness between the peeling surface and the free surface of the metallic foil obtained upon peeling of the metal (metallic film) can be reduced.

In a case where the metallic foil is manufactured by using, for example, a cathode of drum type (cathode drum 1) or a cathode of belt type (cathode belt 24) by electrolysis, it is common that both sides in a width direction of the drum-shaped or belt-shaped electrodeposition surface are covered with insulating tapes at intervals corresponding to a width dimension of the metallic foil, and the metal (metallic film) is electrodeposited on a surface of a center portion sandwiched by the insulating tapes on both sides of the electrodeposition surface. However, when the electrodeposition surface having the uneven surface morphology is used, there is a fear that an abnormal electrodeposition in which the metal is also electrodeposited in a gap between the insulating material configuring the insulating tape and the electrodeposition surface may occur. Since the abnormally electrodeposited portion of the metal film in such a state generates resistance during peeling, cracks in the edge portion of the metal film may occur, or the metal film may break when the crack is excessive. Therefore, in the metallic foil manufacturing method of the invention using the electrodeposition surface having uneven surface morphology; the surface roughness $R_{ZJIS}$ may be uniformly 4 μm to 10 μm in the width direction of the cathode, but it is preferable that the surface roughness $R_{ZJIS}$ of the center portion substantially corresponding to the product portion of the metallic foil is set to 4 μm to 10 μm, and the surface roughness $R_{ZJIS}$ of adjacent portions on both sides of the center portion is set to 2.5 μm or less. Since the insulating tapes describe above are provided on outer sides of the adjacent portions, when peeling off the metal film from the electrodeposition surface of the cathode, occurrence of defects such as cracks at the edge portion of the metal film and fractures of the metal film due to the cracks is further reduced.

In a case where the surface roughness $R_{ZJIS}$ of the adjacent portions which form both end sides including the edge portions of the metallic film is 2.5 μm or less, the surface roughness on both end sides including the edge portions of the peeling surface of the metallic foil formed by transfer of the surface morphology of the adjacent portions is also substantially the same, so that the surface morphology on front and back sides of the edge portions of the metal foil are different. In a case where the edge portion sides of the metallic foil corresponding to the adjacent portions are removed with the difference in the surface morphology limited to the edge portion side of the metallic foil being unacceptable, the adjacent portions having different surface morphology can also be easily distinguished from the center portion. The surface roughness $R_{ZJIS}$ of the adjacent portion may be 2 μm or less. The adjacent portion can be formed by a simple method such as masking a region corresponding to an adjacent portion on a smoothed surface having a surface roughness $R_{ZJIS}$ of less than 2 μm, and performing the roughening treatment and the oxidation treatment in this state.

Figure 4:
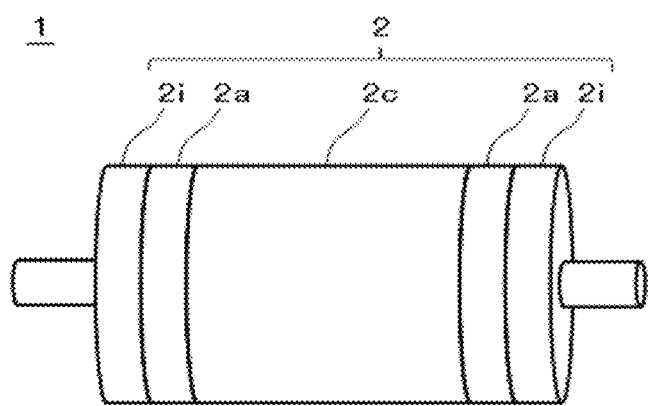
FIG. 4 is a diagram showing a configuration example of a cathode of drum type (cathode drum) applicable to the invention.

FIG. 4 shows a configuration example of a cathode of drum type (cathode drum) preferably having the electrodeposition surface described above. In the configuration example shown in FIG. 4, a cylindrical outer periphery 2 corresponding to an electrodeposition surface of a cathode drum 1 is divided into five regions in the width direction, and the cathode drum 1 is configured by a center portion 2c, adjacent portions 2a on both sides of the center portion 2c, and insulating portions 2i on outer sides of the adjacent portions 2a. The center portion 2c is an oxidized surface which is formed by the forming process shown in FIG. 3 as described above, has uneven surface morphology with a surface roughness $R_{ZJIS}$ of 4 μm to 10 μm, and has an oxidation layer with a thickness of 30 nm to 250 nm on the outermost layer. The insulating portions 2i are provided for determining the width dimension of the metallic foil and can be formed by a method, such as attaching insulating materials to the outer periphery 2. The insulating material has resistance to an electrolytic solution in which the cathode drum 1 is immersed, and has an insulating property with which the metal is not easily electrodeposited in the electrolytic solution or under general electrolytic conditions.

The adjacent portion 2a is an oxidized surface which is formed similarly to the center portion 2c, has surface morphology with a surface roughness $R_{ZJIS}$ of 2.5 μm or less that is slightly smoother than the center portion 2c, and has an oxidation layer substantially similar to the center portion 2c on the outermost layer thereof. The oxidized surface (adjacent portion 2a) having the surface morphology slightly smoother than that of the center portion 2c can be formed by methods such as, for example, a method of masking the region corresponding to the adjacent portion 2a during the roughening treatment to suppress the progress of roughening, a method of mechanically or chemically polishing the region corresponding to the adjacent portion 2a after the roughening treatment, or a method of mechanically polishing the region corresponding to the adjacent portion 2a after the oxidation treatment, in a case where the adjacent portion 2a is polished after the oxidation treatment to form a slightly smooth surface, a thickness of an oxidation layer of the adjacent portion 2a becomes slightly thinner than the center portion 2c, which is considered to be acceptable.

When a metallic foil is manufactured by using the cathode drum 1 having such a configuration, the metal (metallic film) is electrodeposited soundly on surfaces of the center portion 2c and the adjacent portions 2a of the cathode drum 1, and the metallic film can be easily and soundly peeled off using a lead member. This is because oxidation layers having a thickness of 30 nm to 250 nm are provided on the outermost layers of the center portion 2c and the adjacent portions 2a of the cathode drum 1, and electrodeposition surfaces (adjacent portions 2a) forming the edge portions of the metal film and having a surface roughness $R_{ZJIS}$ of 2.5 μm or less is provided to be adjacent to an electrodeposition surface (center portion 2c) forming the center portion of the metal film and having a surface roughness $R_{ZJIS}$ of 4 μm to 10 μm. In other words, that is because the abnormal electrodeposition which occurs in the gaps between the outer periphery 2 (surface of the electrodeposition surface) and the insulating portions 1i of the cathode drum 1 is suppressed.

In a case of using the above electrodeposition surface having the adjacent portions 2a, it is preferable that a ratio of a width of each adjacent portion 2a to a width of the center portion 2c is set to about 0.1% to about 10%. As described above, when the adjacent portion 2a is formed on a surface that is slightly smoother than the center portion 2c, there is a difference in the surface morphology between front and back sides of edge portions of the metallic foil. If such a difference is not acceptable, the edge portion side of the metallic foil corresponding to the adjacent portion 2a may be removed. In such a case, when the ratio of the width of each adjacent portion 2a to the width of the center portion 2c is about 0.1% to about 10%, reduction in yield due to removal of the edge portion side of the metallic foil can be suppressed.

Further, when the ratio of the width of each adjacent portion 2a to the width of the center portion 2c is about 0.1% or more, concentration of an electrolytic current caused by the center portion 2c having the uneven surface morphology and the insulating portion 1i is easily suppressed, and the peelability of the metal film is easily ensured. When the ratio of the width of each adjacent portion 2a to the width of the center portion 2c is about 10% or less, a width on the edge portion side to be removed from the metallic foil is relatively small and the reduction in yield of the metallic foil is easily suppressed. Removal of the edge portion side of the metallic foil is performed such that only a portion in which the uneven surface morphology of the center portion 2c of the cathode drum 1 is transferred is remained, so that the metallic foil having surface morphology in which the front and back surfaces are roughened to the same extent can be obtained.

EXAMPLE

The invention will be described in detail by way of examples which are considered to be preferable and comparative examples. For convenience, the descriptions shown in FIGS. 1 to 4 are used for explanation. The invention is not intended to be limited to the following description.

In the example of the invention and comparative examples, an aluminum toil (metallic foil) having a thickness of 12 μm and a width of 600 mm was manufactured by electrolysis using a cathode drum 1 provided with a copper lead member 8 formed by electrolysis on an outer periphery 2. The outer periphery 2 of the cathode drum 1 was made of titanium and was divided into five regions (center portion 2c, two adjacent portions 2a, and two insulating portions 2i) in a body length direction (width direction). The lead member 8 was a copper foil (electrolytic copper foil) formed by partway peeling off a copper film formed by electrolysis from the outer periphery 2 of the cathode drum 1. Therefore, when the manufacturing of an aluminum foil by electrolysis was started, the aluminum is electrodeposited on a surface of the copper film, the aluminum is newly electrodeposited on the electrodeposition surface after the copper foil (lead member 8) is obtained by peeling off the copper film on which the aluminum is electrodeposited, and the newly electrodeposited and grower aluminum film is peeled off. The anode member 3 was made of aluminum.

A nonaqueous solution, in which dimethylsulfone ($DMSO_2$) of a solvent set to 10, aluminum chloride ($AlCl_3$) of an electrolyte set to 3.8, trimethylamine hydrochloride (TMA-HCl) of an additive set 0.05 in molar ratio were blended, was used as an electrolytic solution for electrodepositing the aluminum. As the electrolytic solution, the $AlCl_3$ and TMA-HCl were mixed and melted in the $DMSO_2$ melted at 110° C. and the mixed solution was thoroughly stirred to obtain a homogeneous solution. Further, in an electrolytic bath 4 for storing the electrolytic solution and conducting electrodeposition of aluminum, nitrogen gas having a dew point of −60° C. or less was introduced to suppress entry of moisture into die electrolytic solution.

The cathode drum 1 having the outer periphery 2 serving as the electrodeposition surface was manufactured by the forming process shown in FIG. 3. Specifically, a titanium material was formed into a cylindrical shape having an outer diameter of 300 mm and a body length of 700 mm, and used to manufacture a drum member having a shape corresponding to the cathode drum 1. Next, an outer periphery of the drum member was smoothed by mechanical polishing, and a surface roughness $R_{ZJIS}$ of the outer periphery (smoothed surface) was formed to about 2.1 μm. Next, the outer periphery (smoothed surface) of the drum member was roughened by a blast treatment considered to be preferable. Specifically, the surface was roughened by a dry blast treatment in which polygonal alumina particles were sprayed. The surface roughness $R_{ZJIS}$ of the roughened outer periphery (roughened surface) was formed to about 4.5 μm in a case where an average particle diameter of the alumina particles is small and was formed to about 8.5 μm in a case where the average particle diameter of the alumina particles is large. Here, the region corresponding to the adjacent portion 2a of the outer periphery (toughened surface) was polished with abrasive paper, and the surface roughness $R_{ZJIS}$ was formed to be about 2.3 μm which is smoother than the roughened surface and close to the smoothed surface.

Here, aluminum as a product is newly electrodeposited on the outer periphery 2 (electrodeposition surface) after the copper film was peeled off to become the copper foil (lead member 8). Therefore, it is necessary to provide an electrodeposition surface in which the newly electrodeposited and grown aluminum film is peeled off soundly. For example, if the copper remains on the outer periphery 2 (electrodeposition surface) after the copper film is peeled off, there is a fear that the peeling of the new aluminum film electrodeposited and grown on the electrodeposition surface may be affected and that a sound aluminum foil cannot be obtained even if the peeling can be performed. It is considered that the copper remaining on the electrodeposition surface was electrodeposited inside of the recessed portions on the surface of the oxidation layer and was separated from the copper film and remained when peeling off die copper film. From this viewpoint, regarding the oxidized surface obtained by oxidizing the outer periphery (roughened surface) of the drum member, the copper is electrodeposited by electrolysis to form a copper film thereon, so that it is necessary to confirm the ease of peeling off the copper film and an extent of remaining copper on the oxidized surface after peeling off the copper film. Therefore, a test piece having a length of 80 mm and a width of 20 mm was cut out from a plate member having a smoothed surface made of pure titanium and having a thickness of 5 mm, various oxidation treatments described above are performed after performing the roughening treatment (dry blast treatment) on a prescribed area of the test piece, copper was electrodeposited on the oxidized surface of each test piece by general electrolysis to form a copper film, and then trials of peeling the copper film from the test pieces were performed. The surface roughness $R_{ZJIS}$ of the roughened surface of tire test piece after the roughening treatment was set to about 4.5 μm to 8.5 μm similar to the toughened surface in the case of the cathode drum 1.

In the trials, peeling quality was judged as "excellent" in a case where the copper film can be peeled off from the test piece with quality of being sufficiently usable as the lead member, was judged as "good" in a case where the copper film can be peeled off from the test piece with quality of being at least usable as the lead member, was judged as "acceptable" in a case where the copper film can be substantially peeled off from the test piece, and was judged as "unacceptable" in a case where the peeled copper film cannot be used as the lead member or the copper film cannot be peeled from the test piece.

In the trials, the difference in the surface morphology between the front and back sides of the copper foil was judged as "large" in a case where the difference in the surface morphology between the front and rear surfaces is large for the copper foil that can be peeled off, was judged as "small" in a case where tire difference is small, and was judged as "unevaluable" for the copper foil that cannot be peeled off.

In the trials, since coloring due to the remaining copper on the oxidized surface was observed, quality of the oxidized surface for the test piece after the copper film was peeling off was judged based on presence or absence of the coloring and a density degree of the coloring, taking the presence or absence of the remaining copper, a distribution state of the remaining copper, and a quantitative degree thereof or the like into consideration. Specifically, the oxidized surface of the test piece after the copper film was peeled off was judged as "excellent" in a case where tire coloring was not observed at all, was judged as "good" in a case where dispersively and extremely thin coloring can be seen throughout or locally, and was judged as "acceptable" in a case where even if the coloring is relatively dark but is observed dispersively, so that the oxidized surface was set as a surface suitable for the electrodeposition surface when die risk of damage during peeling and surface defects of the metallic foil is low. Further, the oxidized surface was judged as "unacceptable" in a case where comparatively dark coloring is intensively observed even if locally, or in a case where dark coloring is observed throughout, so that the oxidized surface was determined as a surface unsuitable for the electrodeposition surface having a high risk of damage during peeling and surface defects of the metal foil.

The tendency obtained by repeating the trials are summarized in Table 1. The "-" in Table 1 means that it is not an evaluation object.

TABLE 1

| TRIAL | ROUGHENING TREATMENT | OXIDATION TREATMENT | MEANS FOR MOVING ANODIC OXIDATION SOLUTION | | PEELING QUALITY | DIFFERENCE IN SURFACE MORPHOLOGY BETWEEN FRONT AND BACK SIDES OF COPPER FOIL | QUALITY OF OXIDIZED SURFACE |
|---|---|---|---|---|---|---|---|
| | | | APPLY A LIQUID FLOW | APPLY AN ULTRASONIC WAVE | | | |
| 1 | BLAST | NO | NO | NO | UNACCEPTABLE | UNEVALUABLE | — |
| 2 | NO | THERMAL OXIDATION ONLY | NO | NO | EXCELLENT | LARGE | EXCELLENT |
| 3 | BLAST | THERMAL OXIDATION ONLY | NO | NO | ACCEPTABLE | SMALL | EXCELLENT |
| 4 | BLAST | ANODIC OXIDATION ONLY | NO | NO | GOOD | SMALL | ACCEPTABLE |

TABLE 1-continued

| | | | MEANS FOR MOVING ANODIC OXIDATION SOLUTION | | | DIFFERENCE IN SURFACE MORPHOLOGY BETWEEN | |
| --- | --- | --- | --- | --- | --- | --- | --- |
| TRIAL | ROUGHENING TREATMENT | OXIDATION TREATMENT | APPLY A LIQUID FLOW | APPLY AN ULTRASONIC WAVE | PEELING QUALITY | FRONT AND BACK SIDES OF COPPER FOIL | QUALITY OF OXIDIZED SURFACE |
| 5 | BLAST | ANODIC OXIDATION ONLY | YES (1200 rpm) | NO | EXCELLENT | SMALL | GOOD |
| 6 | BLAST | ANODIC OXIDATION ONLY | NO | YES (43 kHz) | EXCELLENT | SMALL | GOOD |
| 7 | BLAST | ANODIC OXIDATION ONLY | NO | YES (23 kHz) | EXCELLENT | SMALL | GOOD |
| 8 | BLAST | ANODIC OXIDATION AFTER THERMAL OXIDATION | NO | NO | GOOD | SMALL | ACCEPTABLE |
| 9 | BLAST | ANODIC OXIDATION AFTER THERMAL OXIDATION | YES (1200 rpm) | NO | EXCELLENT | SMALL | GOOD |
| 10 | BLAST | ANODIC OXIDATION AFTER THERMAL OXIDATION | NO | YES (43 kHz) | EXCELLENT | SMALL | GOOD |
| 11 | BLAST | ANODIC OXIDATION AFTER THERMAL OXIDATION | NO | YES (23 kHz) | EXCELLENT | SMALL | GOOD |
| 12 | BLAST | THERMAL OXIDATION AFTER ANODIC OXIDATION | NO | NO | GOOD | SMALL | ACCEPTABLE |
| 13 | BLAST | THERMAL OXIDATION AFTER ANODIC OXIDATION | YES (1200 rpm) | NO | EXCELLENT | SMALL | GOOD |
| 14 | BLAST | THERMAL OXIDATION AFTER ANODIC OXIDATION | NO | YES (43 kHz) | EXCELLENT | SMALL | GOOD |
| 15 | BLAST | THERMAL OXIDATION AFTER ANODIC OXIDATION | NO | YES (23 kHz) | EXCELLENT | SMALL | GOOD |

The "BLAST" described in Table 1 means the dry blast treatment. The "THERMAL OXIDATION" described in Table 1 means a thermal oxidation treatment in which the temperature is held at 500 C for about 60 minutes by in-furnace heating in the air atmosphere as described above. The "ANODIC OXIDATION" described in Table 1 means the anodic oxidation in which preferred conditions of the anodic oxidation is selected, and the phosphoric acid aqueous solution having a concentration of about 1% is kept at about 25° C. and energization (applying voltage) is performed for about 4 seconds at a cutoff voltage of 100 V. The "APPLY A LIQUID FLOW" described in Table 1 means the means for applying a liquid flow by vortex stirring using a hot stirrer REXIM (model number: RSH-1 DN, rotational speed: 1,200 rpm) manufactured by AS ONE Corporation. The "APPLY AN ULTRASONIC WAVE" described in Table 1 refers to the means for applying a predetermined frequency using an ultrasonic cleaner (model number: AUS-3D, output: 80 W, frequency: 23 kHz or 43 kHz) manufactured by AS ONE Corporation.

Peeling Quality

The tendency whether or not the copper foil can be peeled off by the presence or absence of the roughening treatment and the tendency of peeling quality of the copper foil in a case of performing the roughening treatment and thermal oxidation can be confirmed based on the tendency obtained by repeating trials 1 to 3 shown in Table 1. Specifically, a tendency that the copper foil cannot be peeled substantially was confirmed in trial 1 (the roughening treatment is performed, and the oxidation treatment is not performed). A tendency that the copper foil can be peeled off with quality of being sufficiently usable as the lead member was confirmed in trial 2 (the roughening treatment is not performed, and the thermal oxidation is performed). A tendency that the copper foil can be peeled substantially was confirmed in trial 3 (the roughening treatment is performed, and the thermal oxidation is performed). As a result, it was found that the peeling of the copper foil becomes possible by performing the thermal oxidation after the roughening treatment. Further, by comparing trials 2 and 3, it was found that peeling resistance of the copper foil was increased by an amount of unevenness of the surface morphology due to the roughening treatment.

The tendency of peeling quality of the copper foil in a case where the roughening treatment and the anodic oxidation were performed, and the tendency of peeling quality of the copper foil, in a case where the anodic oxidation solution is further moved in the anodic oxidation can be confirmed based on the tendency obtained by repeating trials 4 to 15 shown in Table 1. Specifically, a tendency that the copper film can be peeled off from the test piece with quality of being at least usable as the lead member was also confirmed in any of trials 4 to 15 in which the roughening treatment and the anodic oxidation were performed. In particular, a tendency that the copper film can be peeled off from the test piece with quality of being sufficiently usable as the lead member was confirmed in trials 5 to 7, 9 to 11 and 13 to 15 in which the roughening treatment and the anodic oxidation using the means for moving the anodic oxidation solution were performed. As a result, it was found that the peeling of the copper foil becomes possible by performing the anodic oxidation after the roughening treatment. It was found that the peeling of the copper foil becomes easy by using the means for applying a liquid flow for moving the anodic oxidation solution or the means for applying ultrasonic waves during the anodic oxidation. In order to facilitate the peeling of the copper foil, it is preferable to move the anodic oxidation solution more actively by combining the means for applying a liquid flow and the means for applying ultrasonic waves.

By comparing trials 8 to 11 with trials 12 to 15, it was found that in the oxidation treatment performed after the roughening treatment, a difference in treatment order of the thermal oxidation and the anodic oxidation does not affect the peelability of the copper foil in a case of performing a combination treatment of thermal oxidation and anodic oxidation. It was found that in the oxidation treatment performed after the roughening treatment, the copper foil can also be peeled off due to any treatment of thermal oxidation, anodic oxidation, or a combination treatment of thermal oxidation and anodic oxidation. By comparing trial 3 with trials 4, 8 and 12, it was found that the anodic oxidation is more effective than the thermal oxidation for facilitating the peeling of the copper foil.

(Difference in Surface Morphology between Front and Back Sides of Copper Foil)

Since the tendency that the copper foil cannot be peeled substantially was confirmed in trial 1 (the roughening, treatment is performed, and the oxidation treatment is not performed) shown in Table 1, the difference in the surface morphology between the front and back sides of the copper foil was not evaluated. The tendency that the difference in the surface morphology between the front and back sides of the copper foil was increased was confirmed in trial 2 (the roughening treatment is not performed, and the thermal oxidation is performed), which is because the roughening treatment was not performed. It was also confirmed that the difference in the surface morphology between the front and back sides of the copper foil became smaller in any of the other trials 3 to 15, which is because the roughening treatment was performed.

Quality of Oxidized Surface

A tendency that there was no coloring on the oxidized surface of the test piece after peeling off the copper film was confirmed in trial 2 (the roughening treatment is not performed) and trial 3 (the roughening treatment is performed) shown in Table 1 in which the thermal oxidation was performed. A tendency that comparatively dark coloring occurs dispersively on the oxidized surface of the test piece after peeling off the copper film was confirmed in trial 4 in which the anodic oxidation was performed after the roughening treatment without using the means for moving the anodic oxidation solution. By comparing trial 3 and trial 4, it was found that coloring tends to occur on an oxidized surface subject to the anodic oxidation more easily than on an oxidized surface subject to the thermal oxidation. A tendency that dispersively and extremely thin coloring was observed throughout or locally was confirmed in trials 5 to 7 in which the anodic oxidation was performed after the roughening treatment using the means for moving the anodic oxidation solution. By comparing trial 4 with trials 5 to 7, it was found that the oxidized surface subjected to the anodic oxidation using the means for moving the anodic oxidation solution has a coloring-suppression effect better than the oxidized surface subjected to the anodic oxidation without using, the means for moving the anodic oxidation solution. The coloring-suppression effect can also be found from comparison between trial 4 and trials 8 to 11 or comparison between trial 4 and trials 12 to 15. Trial 1 in which the oxidation treatment is not performed, is not an evaluation object of the quality of the oxidized surface.

In the outermost layer of the oxidized surface, an oxidation layer by the thermal oxidation was confirmed in trials 2 and 3, and an oxidation layer by the anodic oxidation was confirmed in trials 4 to 11. The oxidation layer formed by the thermal oxidation was thicker than an extremely dense oxidation layer (natural oxidation layer) naturally formed in contact with the atmosphere, and formed relatively densely. The oxidation layer formed by the anodic oxidation was sufficiently thick as compared with the relatively dense oxidation layer formed by the thermal oxidation although it was not dense. In a case where the oxidation treatment was performed after the roughening treatment, it is considered that the difference in thickness and denseness of the oxidation layer formed on the outermost surface of the oxidized surface affects the peeling quality of the copper foil (difficulty in peeling) and quality of the oxidized surface (coloring degree).

In order to enable peeling of the copper foil and reduce the difference in surface morphology of the copper foil based on the tendencies obtained by repeating the trials, it was found that the oxidation treatment on the roughened surface is important. It was found that as the oxidation treatment for the purpose, any oxidation treatment of thermal oxidation, anodic oxidation, or a combination treatment of thermal oxidation and anodic oxidation can be applied. Further, it was found that during the anodic oxidation, it is preferable to use the means for applying a liquid flow or the means for applying ultrasonic waves to move the anodic oxidation solution in contact with the roughened surface.

Next, the oxidation treatment was performed on the outer periphery (roughened surface) of the drum member corresponding to the cathode drum 1 after the roughening treatment. As the oxidation treatment, the anodic oxidation which is performed while moving the anodic oxidation solution using the means for applying a liquid flow considered to be preferable was selected based on the tendencies obtained by the various trials shown in Table 1 using the test pieces. The means for applying a liquid flow can be a simple and inexpensive configuration compared with the means for applying ultrasonic waves, and was set to configure a liquid circulation system for pouring the anodic oxidation solution into the anodic oxidation tank and discharging the liquid from the anodic oxidation tank. The anodic oxidation was performed for about 2 seconds while generating a liquid flow by the above means under a constant current condition with a current density of about 100 $mA/cm^2$ (with a cutoff voltage selected in a range of about 5 V to about 200 V) by completely immersing the outer periphery (roughened surface) of the drum member serving as an anode in a bath in which a phosphoric acid aqueous solution with a concentration of 0.5% was kept at a temperature about 20° C. to about 30° C. Before performing the anodic oxidation, only a degreasing treatment using a sodium hydroxide aqueous solution at 50° C. was performed and pickling using a strong acid was not performed as a pre-treatment. For example, in a case where the cutoff voltage was set to 10 V in the anodic oxidation, the oxidation layer having an average thickness of about 30 nm can be formed on the outermost layer of the roughened surface by the pre-treatment and the anodic oxidation.

The thickness of the formed oxidation layer is controlled by utilizing a fact that the thickness is increased by an increase in applied voltage, an increase in treatment time or both. An average thickness of the oxidation layer was calculated by observing a cross section of the oxidation layer by a transmission electron microscope (TEM), measuring widths of the band-shaped contrast image recognized as the oxidation layer in an observation region at arbitrarily selected positions, and averaging the measured values.

thickness (average thickness) of the oxidation layer is outside the range of the invention, a predetermined roughening treatment and oxidation treatment were performed on those arbitrarily selected from a group in which trial C2 was performed.

TABLE 2

| TRIAL | | | SMOOTHING TREATMENT | ROUGHENING TREATMENT (BLAST) | OXIDATION TREATMENT (ANODIC OXIDATION (CUTOFF VOLTAGE)) | AVERAGE THICKNESS OF OXIDATION LAYER (nm) | SURFACE ROUGHNESS $R_{ZJIS}(\mu m)$ |
|---|---|---|---|---|---|---|---|
| COMPARATIVE EXAMPLES | | A | PERFORMED | — | — | 10 | 2.1 |
| | | B | PERFORMED | — | PERFORMED (100 V) | 165 | 3.4 |
| | | C1 | PERFORMED | PERFORMED | — | 10 | 4.3 |
| | | C2 | PERFORMED | PERFORMED | — | 10 | 6.0 |
| | | C3 | PERFORMED | PERFORMED | — | 10 | 8.6 |
| EXAMPLES OF THE INVENTION | | D1 | PERFORMED | PERFORMED | PERFORMED (10 V) | 30 | 4.6 |
| | | D2 | PERFORMED | PERFORMED | PERFORMED (100 V) | 165 | 3.6 |
| | | D3 | PERFORMED | PERFORMED | PERFORMED (150 V) | 250 | 8.5 |
| COMPARATIVE EXAMPLES | | D4 | PERFORMED | PERFORMED | PERFORMED (5 V) | 15 | 5.6 |
| | | D5 | PERFORMED | PERFORMED | PERFORMED (200 V) | 320 | 5.8 |

Further, in the outer periphery (oxidized surface) of the drum member corresponding to the cathode drum 1 subject to the anodic oxidation, a center region thereof in the body length direction (width direction) was defined as the center portion 2c, and regions adjacent to the center portion 2c were defined as the adjacent portions 2a. The surface roughness $R_{ZJIS}$ of the center portion 2c is substantially equal to that of the roughened surface and was formed finely to about 4.5 μm, and roughly to about 8.5 μm. The surface roughness $R_{ZJIS}$ of the adjacent portion 2a which was equal to that of the roughened surface was set to 2.5 μm or less by further polishing.

Next, the insulating portions 2i were formed on the outer sides of the adjacent portions 2a on the outer periphery (oxidized surface) of the drum member corresponding to the cathode drum 1 by using insulating tapes. The interval in the body length direction of the insulating portions 2i corresponds to the width (600 mm) of the aluminum foil to be manufactured. Therefore, the outer periphery 2 of the cathode drum 1, that is, the electrodeposition surface for electrodepositing aluminum having a width of 580 mm at the center portion 2c, a width of 10 mm on one of the adjacent portions 2a adjacent to both sides of the center portion, and the entire width (interval in the body length direction of the insulating portions 2i) of 600 mm can be formed. In this case, the width of the adjacent portion 2a is about 1.7% (=10 mm/580 mm×100) of the width of the center portion 2c.

During forming of the electrodeposition surface (outer periphery 2) of the cathode drum 1, an average thickness of the oxidation layer on the surface corresponding to the center portion 2c in a group in which each of the smoothing treatment, the roughening treatment and the oxidation treatment is performed, and surface roughnesses $R_{ZJIS}$ thereof are shown in Table 2. In trials D1 to D3 shown in Table 2 as an example of the invention, the smoothing treatment, the roughening treatment and the anodic oxidation were performed in this order so as to obtain an oxidation layer having an average thickness in a range of about 30 nm to about 250 nm on the outermost layer. In trial B and C1 to C3 shown in Table 2 as comparative examples for any one of the roughening treatment and the oxidation treatment is not performed, a predetermined roughening treatment or oxidation treatment was performed on those arbitrarily selected from a group in which trial A was performed. In trials D4 and D5 shown in Table 2 as the comparative examples for the The aluminum foil having a thickness of 12 μm and a width of 600 mm was manufactured by the metallic foil manufacturing device shown in FIG. 1 using each cathode drum 1 manufactured by trials A, B, C1 to C3 and D1 to D5 shown in Table 2. First, the lead material 8 was formed on the outer periphery 2 of the cathode drum 1 for initial peeling of the aluminum foil and, subsequent winding onto the winding reel 7. Before placing the cathode drum 1 in the electrolytic bath 4, the lead member 8 was formed to have a leading end portion obtained by continuously peeling off the copper (copper film) electrodeposited by copper electrolysis on the outer periphery 2 and a rear end portion in a state of being in close contact with the outer periphery 2 of the cathode drum 1. Thereafter, the cathode drum 1 with the lead member 8 was sufficiently washed and dried, and then placed in the electrolytic bath 4. When the cathode drum 1 was immersed in the electrolytic solution 5 together with the rear end portion of the lead member 8, the cathode drum was arranged to face the anode member 3 immersed in the electrolytic solution 5 such that an interval therebetween becomes substantially constant. Further, the leading end portion of the lead member 8 was drawn from the drawing-out opening 6 of the electrolytic bath 4 to the outside, and fixed to the winding reel 7 using a tape.

After the setup, in any of trials A, B, C1 to C3, and D1 to D5, the electrolyte solution 5 was kept at about 110° C. while stirring, the current density was set to 100 mA/cm², and energization was performed. Next, rotation of the cathode drum 1 and rotation of the winding reel 7 were started while electrodepositing the aluminum on at least a part of the surface of the lead member 8 in close contact with the outer periphery 2 of the cathode drum 1, and an aluminum film 9 grown by electrodeposition in the electrolytic solution 5 was peeled off together with the lead member 8 by a tensile force of the winding reel 7. If the electrodeposition of aluminum can be continuously continued without stopping energization thereafter by such a metallic foil manufacturing process, the aluminum film 9 is peeled off from the electrodeposition surface after the lead member 8 was completely peeled off from the cathode drum 1, and the aluminum foil having an average thickness of about 12 μm and a width of about 600 mm can be wound around the winding reel 7.

Table 3 shows the peelability (such as whether can be peeled off, or stability in a peelable case, etc.) of the aluminum film when continuous production of the aluminum foil is tried by the above metallic foil manufacturing process, defects or the like that occurred easily in the obtained aluminum foil, and an average surface roughness $R_{ZJIS}$ of the peeling surface and the free surface of the obtained aluminum foil. In trials C1 to C3 shown in Table 3 as comparative examples, since cracks and fractures occurred frequently in the aluminum film during the peeling, the foil cannot be peel off continuously, but a thin aluminum piece that can be partially peeled off was obtained. The surface roughness of the obtained aluminum foil or the aluminum foil piece was randomly measured in a region corresponding to the center portion $2c$ of the outer periphery 2 of the cathode drum 1 on the peeling surface, and was randomly measured in a region on the free surface that is roughly on a back side of the measurement position of the peeling surface. The surface roughness was measured using a shape analysis laser microscope (model number: VK-X160, 50× lens) manufactured by Keyence Corporation in a state where laser light was irradiated substantially perpendicularly to five areas each having a size of 100 μm×100 μm in a planar view. For the surface roughness, an average value in each region was set as the surface roughness value in that region.

occur in the edge portion of some of the aluminum foil that can be peeled off and there is a possibility that the peelability of the electrodeposition surface was insufficient. Further, although the peeling can be performed easily and stably in trial D5, pinholes that are considered to be defective in electrodeposition on some of the aluminum foil that can be peeled off are generated and there is a possibility that the electrodeposition of aluminum was hindered by deep recesses formed on the electrodeposition surface having a thick oxidation layer formed by the anodic oxidation.

Figure 5:
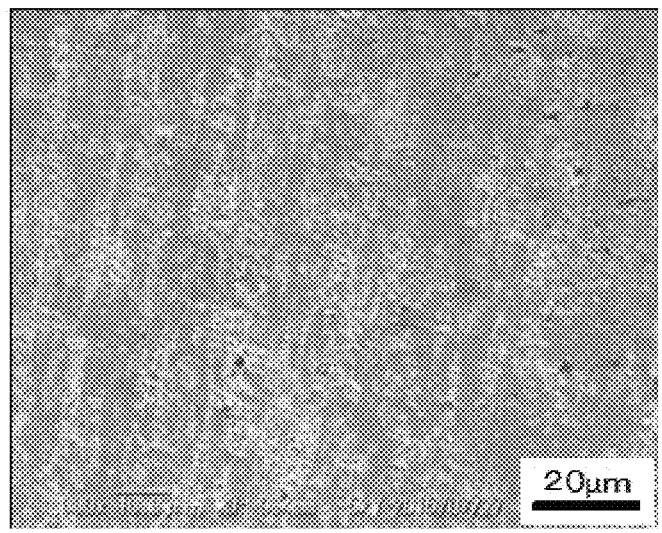
FIG. 5 is an observation image of a peeling surface of an aluminum foil in trial by SEM.
Figure 6:
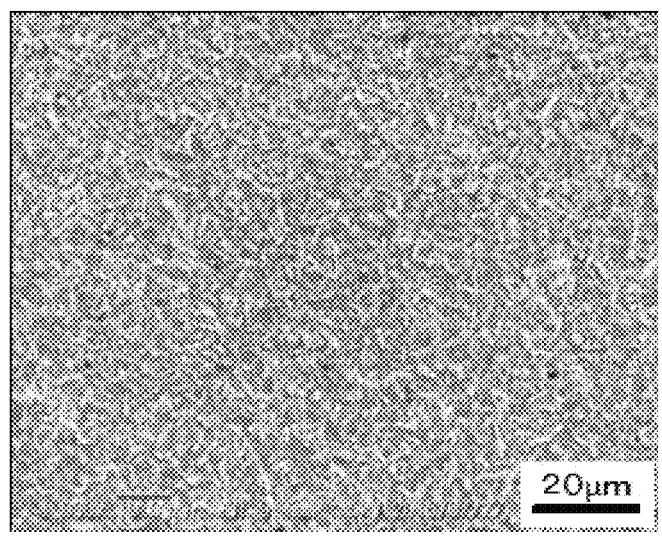
FIG. 6 is an observation image of a free surface of the aluminum foil in trial A by SEM.
Figure 7:
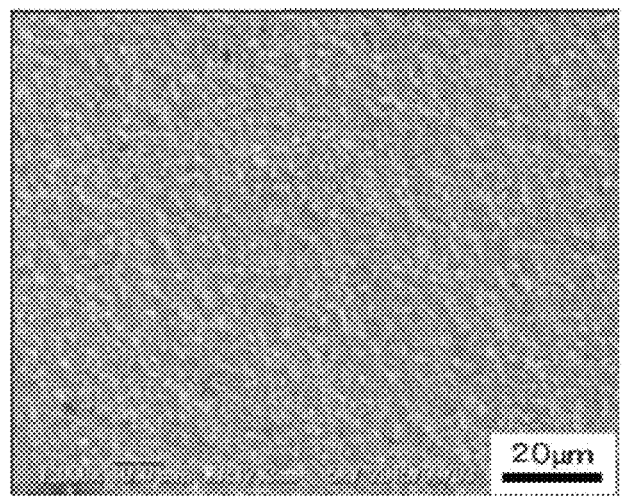
FIG. 7 is an observation image of a peeling surface of aluminum foil in trial D1 by SEM.
Figure 8:
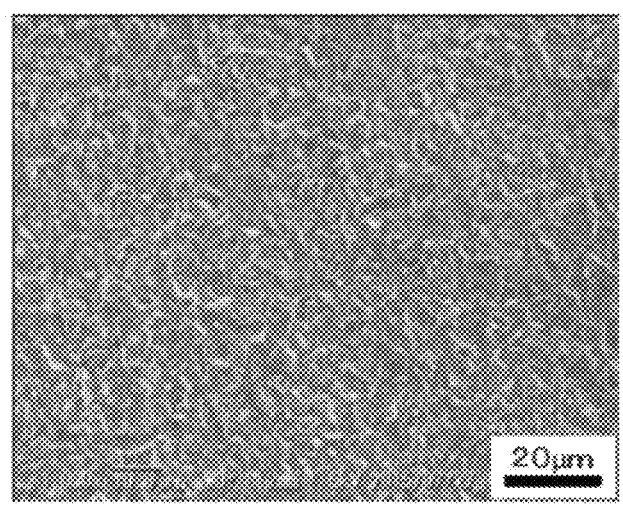
FIG. 8 is an observation image of a free surface of the aluminum foil in trial D1 by SEM.

FIGS. 5 to 8 each show an example of an observation image of an external appearance of the aluminum foil prepared by using the above cathode drum. FIGS. 5 and 6 show the case of trial A and FIGS. 7 and 8 show the case of trial D1. FIGS. 5 and 7 show the peeling surface of the aluminum foil, and FIGS. 6 and 8 show the free surface of the aluminum foil. Each observation image is obtained by a scanning electron microscope (SEM). In the aluminum foil in trial A shown in FIGS. 5 and 6, a random fine mesh-shaped structure was observed on the free surface and streak-like polishing traces due to the smoothing treatment was clearly observed on the peeling surface. Meanwhile, in the aluminum foil in trial D1 shown in FIGS. 7 and 8, similar

TABLE 3

| TRIAL | | PEELABILITY OF ALUMINIUM FOIL | DEFECT ETC. THAT EASILY OCCURRED ON ALUMINIUM FOIL | SURFACE ROUGHNESS $R_{ZJIS}$ OF ALUMINIUM FOIL (INCLUDING FOILPIECE) (μm) | | |
|---|---|---|---|---|---|---|
| | | | | PEELING SURFACE | FREE SURFACE | DIFFERENCE BETWEEN FREE SURFACE AND PEELING SURFACE |
| COMPARATIVE EXAMPLES | A | PEEL ABLE EASILY AND STABLY | DIFFERENCE IN SURFACE MORPHOLOGY | 3.0 | 6.0 | 3.9 |
| | B | PEELABLE EASILY AND STABLY | DIFFERENCE IN SURFACE MORPHOLOGY | 3.4 | 5.1 | 2.7 |
| | C1 | FRACTURED EASILY AND CANNOT PEEL OFF | FRACTURED TO FOIL PIECE | 4.5 | 5.6 | 1.1 |
| | C2 | FRACTURED EASILY AND CANNOT PEEL OFF | FRACTURED TO FOIL PIECE | 6.5 | 5.5 | −0.1 |
| | C3 | FRACTURED EASILY AND CANNOT PEEL OFF | FRACTURED TO FOIL PIECE | 7.9 | 7.5 | −0.4 |
| EXAMPLES OF THE INVENTION | D1 | PEEL ABLE EASILY AND STABLY | NO SPECIAL | 4.6 | 6.2 | 1.6 |
| | D2 | PEELABE EASILY AND STABLY | NO SPECIAL | 5.9 | 5.9 | LESS THAN 0.1 |
| | D3 | PEELABLE EASILY AND STABLY | NO SPECIAL | 7.6 | 7.9 | 0.3 |
| COMPARATIVE EXAMPLES | D4 | PEELABLE BUT NOT EASILY AND STABLY | CRACK DEFECT | 0.5 | 7.0 | 0.5 |
| | D5 | PEELABLE EASILY AND STABLY | PINHOLE DEFECT | 5.7 | 5.6 | 0.9 |

In each trial shown in Table 3, continuous peeling of the aluminum film grown by electrodeposition on a surface of the electrodeposition surface of the cathode drum 1 is possible in any one of trials A and B and D1 to D5 excluding trials C1 to C3. Further, it is confirmed that a difference in surface roughness $RZ_{JIS}$ between the free surface and the peeling surface of the aluminum foil is 2 μm or less, and the difference in the surface morphology is decreased in trials D1 to D5 using the oxidized surface formed by performing oxidation treatment (anodic oxidation) after the roughening treatment (blast treatment) as the electrodeposition surface. However, it was confirmed that the difference in surface roughness $R_{ZJIS}$ between the free surface and the peeling surface of the aluminum foil exceeds 2 μm, and the difference in the surface morphology was increased in trials A and B in which the roughening treatment was not performed. In trial D4, the peeling may become unstable, and t cracks random fine mesh pattern was observed on the free surface and the peeling surface, and the peeling surface was slightly rough by a difference (1.6 μm) in surface roughness $R_{ZJIS}$, but it is considered that such a difference does not have a substantial affect. Further, although not shown in the observation image, it was confirmed that the difference in the surface morphology between the peeling surface and the free surface of the aluminum foil is sufficiently small in trial D2 (less than 0.1 μm) or trial D3 (0.3 μm) in, which a difference in surface roughness $R_{ZJIS}$ is smaller than that in trial D1 shown in FIGS. 7 and 8.

As described above, according to the application of the invention, it was confirmed that peeling of the metallic film (aluminum film or the like) electrodeposited and grown on the electrodeposition surface of the cathode is easy, and meanwhile on the peeling surface and the free surface of the metallic foil (aluminum foil or the like) obtained upon peeling of the metallic film, no clear difference such as streak pattern in appearance structure was observed, and the surface roughness $R_{ZJIS}$ of the peeling surface and the free surface is roughly equal (4 μm to 10 μm), so that the difference in the surface roughness $R_{ZJIS}$ between the peeling surface and the free surface is reduced (2 μm or less).

DESCRIPTION OF REFERENCE NUMERALS

1 cathode drum
2 outer periphery
2a adjacent portion
2c center portion
2i insulating tape
3 anode member
4 electrolytic bath
5 electrolytic solution
6 drawing-out opening
7 winding reel
8 lead member
9 metallic film
22 electrolytic solution
23 anode member
24 cathode belt
25 driving roller
26 driven roller
27 metallic foil
28 rotation Shaft
100 device
200 device

The invention claimed is:

1. A method for manufacturing a metallic foil comprising forming an electrodeposition surface on a surface of a cathode by:
performing a roughening treatment on a smoothed surface made of titanium or titanium alloy to form a roughened surface; and
performing an oxidation treatment selected from the group consisting of thermal oxidation, anodic oxidation, and a combination treatment of thermal oxidation and anodic oxidation, the oxidation treatment being performed on the roughened surface to form an oxidation layer with a thickness of 30 nm to 250 nm on an outermost layer,
the electrodeposition surface having:
a center portion in a width direction of the cathode, the center portion corresponding to a product portion of the metallic foil and having a surface roughness $R_{ZJIS}$ of 4 μm to 10 μm; and
adjacent portions on both sides of the center portion, the adjacent portions having a surface roughness $R_{ZJIS}$ of 2.5 μm or less,
electrodepositing a metallic film by electrolysis on the electrodeposition surface, and peeling the metallic film from the electrodeposition surface to obtain the metallic foil.

2. The method for manufacturing a metallic foil according to claim 1,
wherein the oxidation treatment is anodic oxidation and the anodic oxidation is performed while moving an anodic oxidation solution in contact with the roughened surface.

3. The method for manufacturing a metallic foil according to claim 2,
wherein the anodic oxidation is performed while moving the anodic oxidation solution in contact with the roughened surface by one selected from the group consisting of a means for applying a liquid flow, a means for applying ultrasonic waves, and a combination of the means for applying a liquid flow and the means for applying ultrasonic waves.

4. The method for manufacturing a metallic foil according to claim 1, wherein
an immersing treatment is performed on the roughened surface as a pre-treatment for the oxidation treatment, the immersing treatment being selected from the group consisting of an immersing treatment in an alkaline solution, an immersing treatment in a strongly acidic solution, and a combination treatment of the immersing treatment in the alkaline solution and the immersing treatment in the strongly acidic solution.

5. The method for manufacturing a metallic foil according to claim 1, wherein the roughening treatment is a blast treatment.

6. The method for manufacturing a metallic foil according to claim 1, wherein the electrodeposition surface has a ratio of a width of each adjacent portion to a width of the center portion of 0.1% to 10%.

* * * * *